(12) United States Patent
Deng

(10) Patent No.: US 11,855,295 B2
(45) Date of Patent: Dec. 26, 2023

(54) BUTTON-TYPE LITHIUM ION BATTERY WITH METAL HOUSING

(71) Applicant: CHONGQING VDL ELECTRONICS CO., LTD., Chongqing (CN)

(72) Inventor: Yaxi Deng, Chongqing (CN)

(73) Assignee: CHONGQING VDL ELECTRONICS CO., LTD., Chongqing (CN)

( * ) Notice: Subject to any disclaimer, the term of this patent is extended or adjusted under 35 U.S.C. 154(b) by 32 days.

(21) Appl. No.: 17/039,974

(22) Filed: Sep. 30, 2020

(65) Prior Publication Data
US 2021/0384482 A1 Dec. 9, 2021

(30) Foreign Application Priority Data
Jun. 5, 2020 (CN) .......................... 202010502381.9

(51) Int. Cl.
*H01M 50/116* (2021.01)
*H01M 50/109* (2021.01)
*H01M 50/531* (2021.01)
*H01M 50/543* (2021.01)
*H01M 50/342* (2021.01)
(Continued)

(52) U.S. Cl.
CPC ..... *H01M 50/116* (2021.01); *H01M 10/0525* (2013.01); *H01M 50/109* (2021.01); *H01M 50/183* (2021.01); *H01M 50/3425* (2021.01); *H01M 50/531* (2021.01);
(Continued)

(58) Field of Classification Search
CPC .......... H01M 50/109; H01M 10/0427; H01M 50/559; H01M 50/153; Y02E 60/10; Y02P 70/50; Y02T 10/70
See application file for complete search history.

(56) References Cited

U.S. PATENT DOCUMENTS 3,982,958 A 9/1976 Newman et al.
7,341,802 B1 3/2008 Ota et al.
(Continued)

FOREIGN PATENT DOCUMENTS

CN 106159350 A 11/2016
CN 106450498 A * 2/2017
(Continued)

OTHER PUBLICATIONS

Machine translation of WO2021244618A1 (Year: 2021).*
(Continued)

*Primary Examiner* — Haroon S. Sheikh

(57) ABSTRACT

The present disclosure provides a button-type lithium ion battery with a metal housing, including: a metal housing; a cell, received in the metal housing; a terminal, disposed on an outside of the metal housing; at least one first electrode tab, arranged on the cell and electrically connected to the metal housing; at least one second electrode tab, arranged on the cell and electrically connected to the terminal; and an insulating member disposed between the metal housing and the terminal; wherein the insulating member is insulating and sealing the metal housing and the terminal; a polarity of the at least one first electrode tab is opposite to that of the at least one second electrode tab; a polarity of the metal housing is opposite to that of the terminal; the metal housing and the terminal are sealed to the insulating member by means of heat or adhesion.

5 Claims, 2 Drawing Sheets

(51) Int. Cl.
  *H01M 50/183* (2021.01)
  *H01M 50/636* (2021.01)
  *H01M 10/0525* (2010.01)

(52) U.S. Cl.
  CPC ....... *H01M 50/543* (2021.01); *H01M 50/636*
         (2021.01); *H01M 2200/20* (2013.01)

(56) References Cited

U.S. PATENT DOCUMENTS

| | | |
|---|---|---|
| 2005/0233212 A1 | 10/2005 | Kaun et al. |
| 2017/0207491 A1* | 7/2017 | Tamachi ................. H01G 11/82 |
| 2020/0403210 A1* | 12/2020 | Tse ...................... H01M 50/186 |
| 2021/0075051 A1 | 3/2021 | Zhou |

FOREIGN PATENT DOCUMENTS

| | | | | |
|---|---|---|---|---|
| CN | 110459705 A | | 11/2019 | |
| EP | 2793285 B1 | | 2/2017 | |
| JP | 2011014297 A | | 1/2011 | |
| JP | 2012094250 A | * | 5/2012 | ............ Y02E 60/10 |
| JP | 2012094250 A | | 5/2012 | |
| KR | 20200020619 A | * | 2/2020 | .......... H01M 50/109 |
| WO | WO2020037535 A1 | | 2/2020 | |
| WO | WO-2021244618 A1 | * | 12/2021 | .......... H01M 50/109 |

OTHER PUBLICATIONS

Machine translation of JP2012094250A (Year: 2012).*
Machine translation of KR20200020619A (Year: 2020).*
Machine translation of CN-106450498-A (Year: 2017).*
European search report, European Application No. 20217263.1, dated Apr. 1, 2021 (7 pages).
Search Report from Singapore, No. 10202105011X, dated Jun. 30, 2022 (11 pages).
First Examination Report from India, No. 202114021433, dated Feb. 23, 2022 (5 pages).
Korean First Office Action, Application No. 10-2021-0017239, dated Jun. 2, 2023 (18 pages).

* cited by examiner

BUTTON-TYPE LITHIUM ION BATTERY WITH METAL HOUSING

CROSS REFERENCE OF RELATED APPLICATIONS

The present application claims foreign priority of Chinese Patent Applications No. 202010502381.9, filed on Jun. 5, 2020 in the State Intellectual Property Office of China, the entire contents of which are hereby incorporated by reference.

TECHNICAL FIELD

The present disclosure relates to the field of lithium ion batteries, and particularly to a button-type lithium ion battery with a metal housing.

BACKGROUND

At present, most battery manufacturers produce lithium secondary batteries with thin metal housings, in which an outer housing of a cell is a round metal housing. A structure of the metal housing include three layers: an inner housing, an outer housing and a sealing ring. In this way, the lithium ion batteries in the related art take up much space in a radial direction, and the space in the radial direction are not fully utilized. That is, there is a technical problem of low energy density of the batteries. Moreover, a sealing between the inner housing and the outer housing is achieved with an R-angle sealing technology and by a compressed plastic sealing ring. However, a measurement of the R-angle is not very accurate in the related art, such that a good sealing between the inner housing and the outer housing cannot be completely guaranteed. That is, there is a technical problem of low reliability and low yield. In addition, the inner housing and outer housing of the metal housing are configured as a cathode and an anode respectively, such that short circuit may occur in the batteries.

In recent years, new structures are developed, such as a similar structure of current power aluminum-housing batteries, as shown in FIG. 1 for a battery in the related art. A single-layer metal housing 83 is configured as an anode. An aluminum cap 81 with another polarity is arranged at a side of the metal housing 83. A riveted structure is arranged to achieve an insulation treatment between the metal housing 83 and the aluminum cap 81. The biggest shortage of the riveted structure is that there are five layers on a side of a cell in an axial direction: the aluminum cap 81, a first insulating layer 82, the metal housing 83, a second insulating layer 84 and a rivet 85. The five-layer structure takes up too much space, usually with a thickness of more than 1 mm. Therefore, the battery cannot make full use of the axial space, that is, there is a technical problem of low energy density.

SUMMARY OF THE DISCLOSURE

The present disclosure provides a button-type lithium ion battery with a metal housing, including: a metal housing; a cell, received in the metal housing; a terminal, disposed on an outside of the metal housing; at least one first electrode tab, arranged on the cell and electrically connected to the metal housing; at least one second electrode tab, arranged on the cell and electrically connected to the terminal; and an insulating member disposed between the metal housing and the terminal; wherein the insulating member is insulating and sealing the metal housing and the terminal; a polarity of the at least one first electrode tab is opposite to that of the at least one second electrode tab; a polarity of the metal housing is opposite to that of the terminal; the metal housing and the terminal are sealed to the insulating member by means of heat or adhesion.

In some embodiments, a surface of the metal housing contacting the insulating member, and end a surface of the terminal contacting the insulating member are both surface treated with metal passivation or complexation.

In some embodiments, a first insulating layer is arranged between the second electrode tab and the metal housing.

In some embodiments, a second insulating layer is arranged on a portion of surfaces of the second electrode tab toward metal housing.

In some embodiments, the metal housing includes a metal shell, and a cover plate disposed at a side of the metal shell and sealed to the metal shell; the cell is received in the metal shell; the first electrode tab is electrically connected to the metal shell or the cover plate; the terminal is disposed on an outer side of the metal shell or the cover plate, and insulating and sealing the metal shell or the cover plate via the insulating member.

In some embodiments, a safety valve is arranged on an inner or outer end surface of the metal shell, the cover plate or the terminal to vent an internal overpressure.

In some embodiments, an injection hole is defined on a surface of the metal shell or the cover plate; a cover sheet is arranged on an outside of the metal shell or the cover plate for sealing the injection hole.

In some embodiments, a safety valve is arranged on an inner or outer surface of the cover sheet to vent an internal overpressure.

In some embodiments, the safety valve is configured as a safety exhaust line with an exhaust pressure relief function.

In some embodiments, the insulating member is made of non-metallic materials comprising one or more of polypropylene, polyethylene, polyetheretherketone, polyfluoroalkoxy, nylon, or epoxy resins.

BRIEF DESCRIPTION OF THE DRAWINGS

To further illustrate technical solutions of embodiments of the present disclosure, drawings needed for description of the embodiments will be briefly introduced. Obviously, the following drawings are only some embodiments of the present disclosure. To any one of skill in the art, other drawings may be obtained without any creative work based on the following drawings.

DETAILED DESCRIPTION

In order to make the objectives, technical solutions, and advantages of embodiments in the present disclosure clearer, the technical solutions in the embodiments of the present disclosure will be described clearly and completely with reference to the accompanying drawings. Obviously, the described embodiments are only some embodiments of the present disclosure. To any one of skill in the art, other embodiments may be obtained without any creative work and should be within the scope of the present disclosure.

Embodiment 1

Figure 1:
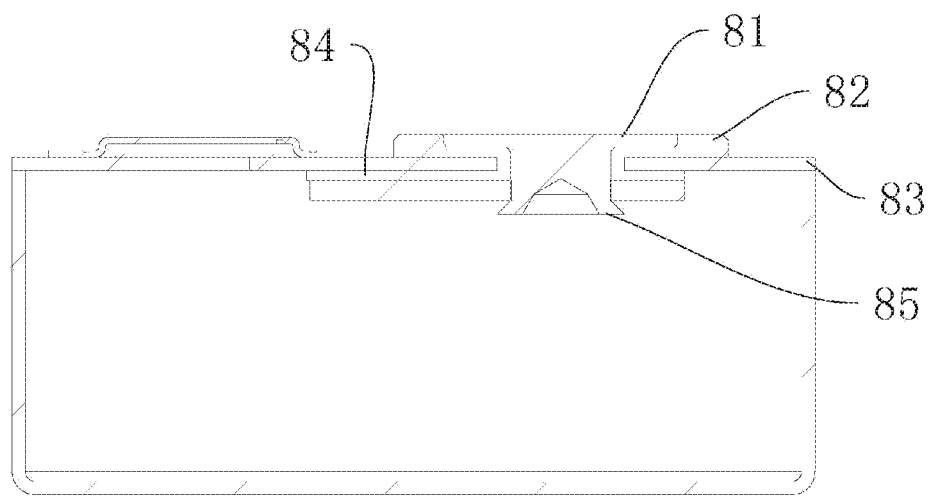
FIG. 1 is a cross-sectional view of a battery provided in the related art.
Figure 2:
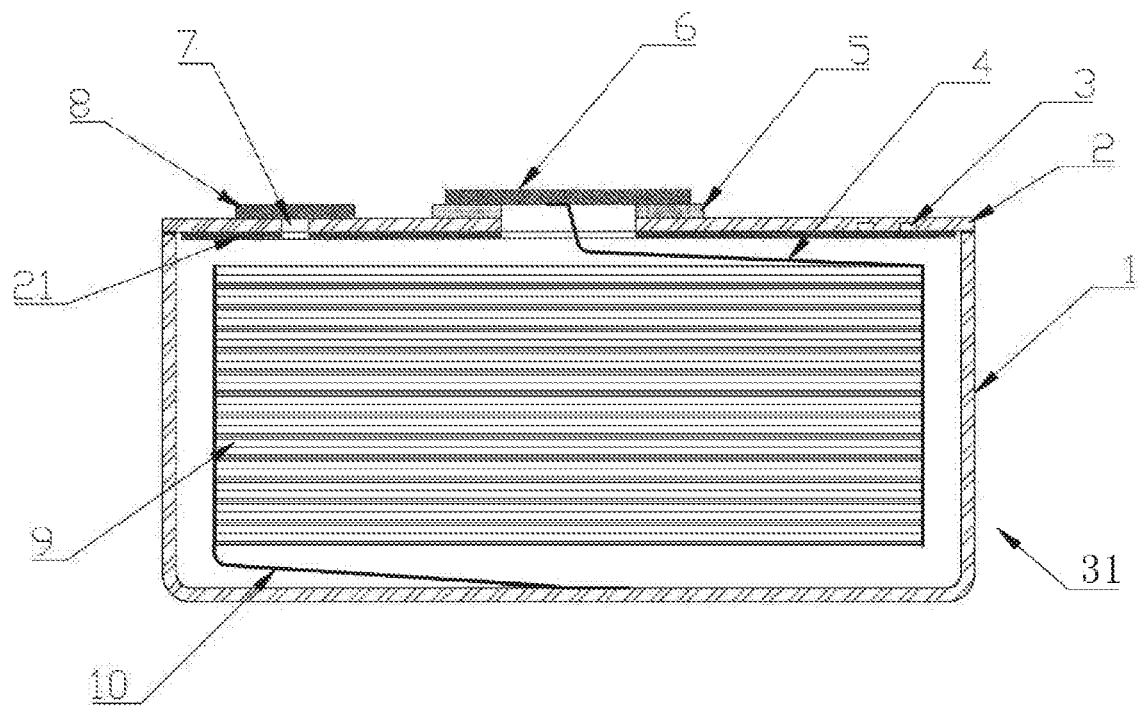
FIG. 2 is a cross-sectional view of a battery according to a first embodiment of the present disclosure.

The present disclosure provides a button-type lithium ion battery with a metal housing. FIG. 2 is a cross-sectional view of a battery according to a first embodiment of the present disclosure. The battery may include a metal housing 31, a cell 9 received in the metal housing 31, a terminal 6 disposed on an outside of the metal housing 31, and an insulating member 5 disposed between the metal housing 31 and the terminal 6. The insulating member 5 is insulating and sealing the metal housing 31 and the terminal 6, respectively. The cell 9 is arranged with at least one first electrode tab 10 electrically connected to the metal housing 31. The first electrode tab 10 has positive or negative polarity. The cell 9 is also arranged with at least one second electrode tab 4 electrically connected to the terminal 6. The second electrode tab 4 has negative or positive polarity opposite to the first electrode tab 10. A polarity of the metal housing 31 is opposite to that of the terminal 6. The metal housing 31 and the terminal 6 are sealed to the insulating member 5 by means of heat or adhesion respectively. The insulating member 5 may be made of non-metallic materials such as polypropylene, polyethylene, polyetheretherketone, polyfluoroalkoxy, nylon, or epoxy resins.

In one embodiment, the metal housing 31 is configured as a polarity and the terminal 6 is configured as the other polarity. The metal housing 31 and the terminal 6 are sealing-connected sealed to the insulating member 5 by means of heat or adhesion respectively. In this way, a good sealing between the terminal 6 and the metal housing 31 may be ensured, a leakage of electrolytes may not occur, and a short circuit between the metal housing 31 and the terminal 6 may not occur, which improves the yield of the battery. More specifically, a surface of the metal housing 31 contacting the insulating member 5, and a surface of the terminal 6 contacting the insulating member 5 are both surface treated with metal passivation or complexation. Due to the surface treatment upon the terminal 6 and the metal housing 31, a good sealing between the metal housing 31 and the insulating member 5, and a good sealing between the terminal 6 and the insulating member 5 may be ensured.

In a radial direction of the battery, an outer side of the cell 9 is only arranged with the single-layer metal housing 31, thereby reducing a space occupied by the structure of the battery in the radial direction, and thus improving an energy density of the battery. In the axial direction, a side of the cell 9 is only arranged with the metal housing 31. Since an insulated sealing connection between the metal housing 31 and the terminal 6 is not achieved by a riveted structure, but by means of heat or adhesion with the insulating member 5, then the metal housing 31, the insulating member 5 and the terminal 6 are arranged in sequence from an inside to an outside of the cell 9 in the axial direction. The three-layer structure may reduce a space occupied by the structure of the battery in the axis direction, further improving the energy density of the battery. The overall energy density of the battery is increased by more than 20%. The technical solutions in the embodiment has advantages of less parts, simple structure and easy assembly to meet the needs of efficient production.

The metal housing 31 may include a metal shell 1, and a cover plate 2 disposed at a side of the metal shell 1 and sealed to the metal shell 1. The cover plate 2 and the metal shell 1 are welded and sealed, such that a sealing between the cover plate 2 and the metal shell 1 may be well ensured to limit the leakage of electrolytes. The cell 9 is received in the metal shell 1. The first electrode tab 10 may be electrically connected to the metal shell 1 or the cover plate 2. In this embodiment, the first electrode tab 10 is electrically connected to an inner side of the metal shell 1. It should be understood that the first electrode tab 10 may also be electrically connected to an inner side of the cover plate 2 or other elements, which is not limited herein. The terminal 6 may be disposed on an outer side of the cover plate 2 or the metal shell 1, and insulating and sealing the cover plate 2 or the metal shell 1 via the insulating member 5. In the embodiment, the terminal 6 is disposed on the outer side of the cover plate 2 and is insulating and sealing the cover plate 2 by means of the insulating member 5. A surface of the terminal 6 contacting the insulating member 5 are surface treated with metal passivation or complexation, to ensure a good seal between the cover plate 2 and the insulating member 5, and thus limit the leakage of electrolytes. It should be understood that the terminal 6 may also be disposed on the outer side of the metal shell 1 or other elements, which is not limited herein.

A first insulating layer 21 is arranged between the second electrode tab 4 and the cover plate 2, to ensure that the second electrode tab 4 and the cover plate 2 may not form a short circuit and ensure the stability of the battery. A second insulating layer may be arranged on a portion of surfaces of the second electrode tab 4 toward the cover plate 2, such that the second electrode tab 4 may not form a short circuit with the cover plate 2, ensuring the stability of the battery.

A safety valve 3 may be arranged on an inner or outer end surface of the metal shell 1, the cover plate 2 or the terminal 6, to vent the internal overpressure. In the embodiment, the safety valve 3 is arranged at the inner end surface of the cover plate 2 to improve the safety and extend the service life of the battery. It should be understood that the safety valve 3 may also be disposed at the metal shell 1, the terminal 6 or other elements, which is not limited herein. In the embodiment, the safety valve 3 is configured as a safety exhaust line with exhaust pressure relief function. In cases of overused battery, battery short-circuit or battery overheat, the internal pressure is prone to largely increasing, at this time the internal gas burst through the safety exhaust line for pressure relief.

An injection hole 7 may be defined on a surface of the metal shell 1 or the cover plate 2. In the embodiment, the injection hole 7 is defined on a surface of the cover plate 2. A sealing of the injection hole 7 may be realized through the steel balls or rivets. A cover sheet 8 may be arranged on an outside of the metal shell 1 or the cover plate 2 for sealing the injection hole 7. When no safety valve 3 is arranged on the inner or outer end surface of the metal shell 1, the cover plate 2 or the terminal 6, the safety valve 3 may be arranged on an inner or outer end surface of the cover sheet 8, to vent the internal overpressure.

The cell 9 may be a winding structure, or a stacking structure stacked in a continuously cycling sequence of cathodes, separators and anodes. The separators may be made into a bag type, enclosing the cathodes or anodes. The multiple layers of cathodes are connected in parallel with each other. The multiple layers of anodes are connected in parallel with each other.

Embodiment 2

Figure 3:
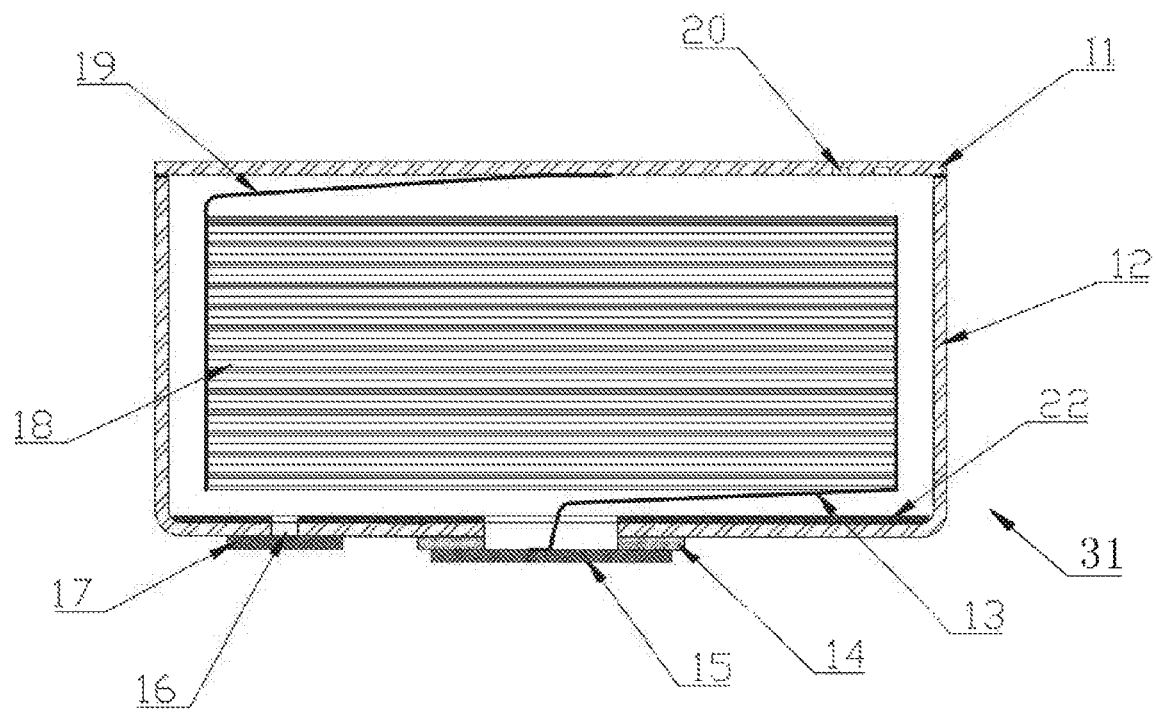
FIG. 3 is a cross-sectional view of a battery according to a second embodiment of the present disclosure.

The present disclosure provides another button-type lithium ion battery with a metal housing 31. FIG. 3 is a cross-sectional structural schematic view of a battery according to a second embodiment of the present disclosure.

A cell 18 is received in the metal housing 31. A terminal 15 is disposed on an outside of the metal housing 31. An insulating member 14 is disposed between the metal housing 31 and the terminal 15. The insulating member 14 is insulating and sealing the metal housing 31 and the terminal 15, respectively. The cell 18 is arranged with at least one first electrode tab 19 electrically connected to the metal housing 31. The first electrode tab 19 has positive or negative polarity. The cell 18 is also arranged with at least one second electrode tab 13 electrically connected to the terminal 15. The second electrode tab 13 has negative or positive polarity opposite to the first electrode tab 19. A polarity of the metal housing 31 is opposite to that of the terminal 15. The metal housing 31 and the terminal 15 are sealed to the insulating member 14 by means of heat or adhesion respectively. The insulating member 14 may be made of non-metallic materials such as polypropylene, polyethylene, polyetheretherketone, polyfluoroalkoxy, nylon, or epoxy resins.

In the embodiment, the metal housing 31 is configured as a polarity and the terminal 15 is configured as the other polarity. The metal housing 31 and the terminal 15 are sealed to the insulating member 14 by means of heat or adhesion respectively. In this way, a good sealing between the terminal 15 and the metal housing 31 may be ensured, and a short circuit between the metal housing 31 and the terminal 6 may not occur, which improves the yield of the battery. More specifically, a surface of the metal housing 31 contacting the insulating member 14, and an end a surface of the terminal 15 contacting the insulating member 14 are both surface treated with metal passivation or complexation. Due to the surface treatment upon the terminal 15 and the metal housing 31, a good sealing between the metal housing 31 and the insulating member 14, and a good sealing between the terminal 15 and the insulating member 14 may be ensured.

In a radial direction of the battery, an outer side of the cell 18 is only arranged with the single-layer metal housing 31, thereby reducing a space occupied by the structure of the battery in the radial direction, and thus improving an energy density of the battery. In the axial direction, a side of the cell 18 is only arranged with the metal housing 31. Since an insulated sealing connection between the metal housing 31 and the terminal 15 is not achieved by a riveted structure, but by means of heat or adhesion with the insulating member 14, then the metal housing 31, the insulating member 14 and the terminal 15 are arranged in sequence from an inside to an outside of the cell 18 in the axial direction. The three-layer structure may reduce a space occupied by the structure of the battery in the axis direction, further improving the energy density of the battery. The overall energy density of the battery is increased by more than 20%. The technical solutions in the embodiment has advantages of less parts, simple structure and easy assembly to meet the needs of efficient production.

The metal housing 31 may include a metal shell 12, and a cover plate 11 disposed at a side of the metal shell 12 and sealed to the same. The cover plate 11 and the metal shell 12 are welded and sealed, such that a sealing between the cover plate 11 and the metal shell 12 may be well ensured to limit the leakage of electrolytes. The cell 18 is received in the metal shell 12. The first electrode tab 19 may be electrically connected to the metal shell 12 or the cover plate 11. In this embodiment, the first electrode tab 19 is electrically connected to an inner side of the metal shell 12. It should be understood that the first electrode tab 19 may also be electrically connected to an inner side of the cover plate 11 or other elements, which is not limited herein. The terminal 15 may be disposed on an outer side of the cover plate 11 or the metal shell 12, and insulating and sealing the cover plate 11 or the metal shell 12 via the insulating member 14. In the embodiment, the terminal 15 is disposed on the outer side of the cover plate 11 and is insulating and sealing the cover plate 11 by means of the insulating member 14. A surface of the terminal 15 contacting the insulating member 14 are surface treated with metal passivation or complexation, to ensure a good seal between the cover plate 11 and the insulating member 14, and thus limit the leakage of electrolytes. It should be understood that the terminal 15 may also be disposed on the outer side of the metal shell 12 or other elements, which is not limited herein.

A first insulating layer 22 is arranged between the second electrode tab 13 and the metal shell 12, to ensure that the second electrode tab 13 and the metal shell 12 may not form a short circuit and ensure the stability of the battery. A second insulating layer may be arranged on a portion of surfaces of the second electrode tab 13 toward the metal shell 12, such that the second electrode tab 13 may not form a short circuit with the metal shell 12, ensuring the stability of the battery.

A safety valve 20 may be arranged on an inner or outer end surface of the metal shell 12, the cover plate 11 or the terminal 15, to vent the internal overpressure. In the embodiment, the safety valve 20 is arranged at the inner end surface of the cover plate 11 to improve the safety and extend the service life of the battery. It should be understood that the safety valve 20 may also be disposed at the metal shell 12, the terminal 15 or other elements, which is not limited herein. In the embodiment, the safety valve 20 is configured as a safety exhaust line with exhaust pressure relief function. In cases of overused battery, battery short-circuit or battery overheat, the internal pressure is prone to largely increasing, at this time the internal gas burst through the safety exhaust line for pressure relief.

An injection hole 16 may be defined on a surface of the metal shell 12 or the cover plate 11. In the embodiment, the injection hole 16 is defined on a surface of the metal shell 12. A sealing of the injection hole 16 may be realized through the steel balls or rivets. A cover sheet 17 may be arranged on an outside of the metal shell 12 or the cover plate 11 for sealing the injection hole 16. When no safety valve 20 is arranged on the inner or outer end surface of the metal shell 12, the cover plate 11 or the terminal 15, the safety valve 20 may be arranged on an inner or outer end surface of the cover sheet 17, to vent the internal overpressure.

The cell 18 may be a winding stricture, or a stacking structure stacked in a continuously cycling sequence of cathodes, separators and anodes. The separators may be made into a bag type, enclosing the cathodes or anodes. The multiple layers of cathodes are connected in parallel with each other. The multiple layers of anodes are connected in parallel with each other.

The beneficial effect of the present invention compared to the prior art is as followed.

1) The metal housing is configured as a polarity and the terminal is configured as the other polarity. The metal housing and the terminal are sealed to the insulating member by means of heat or adhesion respectively. In this way, a good sealing between the terminal and the metal housing may be ensured, a leakage of electrolytes may not occur, and a short circuit between the metal housing and the terminal may not occur, which improves the yield of the battery.

2) In a radial direction of the battery, an outer side of the cell is only arranged with the single-layer metal housing, thereby reducing a space occupied by the structure of the battery in the radial direction, and thus improving an energy density of the battery.

3) In an axial direction, a side of the cell is only arranged with the metal housing. Since an insulated sealing connection between the metal housing and the terminal is not achieved by a riveted structure, but by means of heat or adhesion with the insulating member, then the metal housing, the insulating member and the terminal are arranged in sequence from an inside to an outside of the cell in the axial direction. The three-layer structure may reduce a space occupied by the structure of the battery in the axis direction, further improving the energy density of the battery. The overall energy density of the battery is increased by more than 20%. The technical solutions in the embodiment has advantages of less parts, simple structure and easy assembly to meet the needs of efficient production.

The above embodiments are only some of implementations of the present disclosure, but not to limit the same. Any other changes, modifications, substitutions, combinations, or simplifications made without departing from the spirit and principle of the present disclosure shall be equivalent substitutions and are within the scope of the present disclosure.

What is claimed is:

1. A button-type lithium ion battery, comprising:
    a metal housing (31), comprising a metal shell (12), and a cover plate (11) disposed at a side of the metal shell (12) and sealed to the metal shell (12);
    a cell (18), received in the metal shell (12);
    a terminal (15), disposed on an outside of the metal shell (12);
    at least one first electrode tab (19), arranged on the cell (18) and electrically connected to the cover plate (11);
    at least one second electrode tab (13), arranged on the cell (18) and electrically connected to the terminal (15); and
    an insulating member (14) disposed between the metal housing (31) and the terminal (15);
    wherein the insulating member (14) is insulating and sealing the metal housing (31) and the terminal (15); a polarity of the at least one first electrode tab (19) is opposite to that of the at least one second electrode tab (13); a polarity of the metal housing (31) is opposite to that of the terminal (15); the metal housing (31) and the terminal (15) are sealed to the insulating member (14) by means of heat or adhesion;
    wherein the terminal (15) is sealed to the metal shell (12) via the insulating member (14);
    wherein a first insulating layer (22) is arranged on a surface of the metal shell (12) opposite to the cover plate (11) and toward the cell (18);
    wherein an injection hole (16) is defined on a surface of the metal shell (12) and the surface faces the terminal (15); a cover sheet (17) is arranged on an outside of the metal shell (12) for sealing the injection hole (16);
    wherein a safety valve (20) is arranged on an inner surface of the cover sheet (17) to vent an internal overpressure.

2. The button-type lithium ion battery according to claim 1, wherein a surface of the metal housing (31) contacting the insulating member (14), and a surface of the terminal (15) contacting the insulating member (14) are both surface-treated with metal passivation or complexation.

3. The button-type lithium ion battery according to claim 1, wherein a second insulating layer is arranged on a portion of a surface of the at least one second electrode tab (13) toward the metal housing (31).

4. The button-type lithium ion battery according to claim 1, wherein the insulating member (14) is made of non-metallic materials comprising one or more of polypropylene, polyethylene, polyetheretherketone, polyfluoroalkoxy, nylon, or epoxy resins.

5. The button-type lithium ion battery according to claim 1, wherein the cell (18) is a winding structure, or a stacking structure stacked in a continuously cycling sequence of cathodes, separators and anodes; the separators enclose the cathodes or the anodes; the cathodes are connected in parallel with each other; the anodes are connected in parallel with each other.

* * * * *